(12) United States Patent
Haglund et al.

(10) Patent No.: US 9,547,935 B2
(45) Date of Patent: Jan. 17, 2017

(54) METHOD AND A SYSTEM FOR BUILDING A THREE-DIMENSIONAL MODEL FROM SATELLITE IMAGES

(71) Applicant: Vricon Systems AB, Linkoeping (SE)

(72) Inventors: Leif Haglund, Brokind (SE); Ola Nygren, Linghem (SE); Folke Isaksson, Linkoeping (SE); Johan Borg, Linkoeping (SE)

(73) Assignee: Vricon Systems AB, Linkoeping (SE)

( * ) Notice: Subject to any disclaimer, the term of this patent is extended or adjusted under 35 U.S.C. 154(b) by 143 days.

(21) Appl. No.: 14/188,454

(22) Filed: Feb. 24, 2014

(65) Prior Publication Data

US 2015/0243072 A1    Aug. 27, 2015

(51) Int. Cl.
  *G06T 17/05*    (2011.01)
  *G06T 7/00*    (2006.01)
  (Continued)

(52) U.S. Cl.
  CPC ............ *G06T 17/05* (2013.01); *G01C 11/06* (2013.01); *G06T 7/0065* (2013.01); *G06T 15/04* (2013.01);
  (Continued)

(58) Field of Classification Search
  None
  See application file for complete search history.

(56) References Cited

U.S. PATENT DOCUMENTS 8,019,736 B1 *    9/2011    Postnikov ......... G06F 17/30241
                                     345/428
8,594,375 B1 *    11/2013    Padwick .............. G06K 9/4652
                                     382/103
(Continued)

FOREIGN PATENT DOCUMENTS

WO    WO 2009/003529 A1    1/2009
WO    WO 2010/068186 A1    6/2010
(Continued)

OTHER PUBLICATIONS

Gruen, Armin, et al., "Precision Processing of High-Resolution Satellite Imagery", In the Proceedings of ASPRS 2005 Annual Conference on Geospatial Goes Global: From Your Neighborhood to the Whole Planet, Mar. 7-11, 2005, 14 pages, Advancing Imaging and Geospatial Information Science and Technology, USA.

(Continued)

*Primary Examiner* — Michelle Chin
(74) *Attorney, Agent, or Firm* — Alston & Bird LLP

(57) ABSTRACT

The invention relates to a method for building a 3D model of an area of interest on the surface of a planet. The method comprises providing a plurality of 2D images from satellites, where each 2D image out of the plurality of 2D images at least partly covers the area of interest. Also, each subarea of the area of interest is covered by at least two images, taken from different angles, out of the plurality of 2D images. Bundle adjustments are performed for the plurality of 2D images and the area of interest is divided into parts. For each part of the area of interest at least one combination and (Continued)

preferably all possible combinations out of two images covering that part of the area of interest are taken. Said two images are taken from the at least two images, taken from at least two different angles, out of the plurality of 2D images. Further, for each part of the area, point matching correspondence is established for a set of points for each such combination of two images. The sets of points are combined if more than one set of points exists. Even further, for each part of the area, a 3D model of said part of the area of interest is built based on the combined set of points. The 3D models from each part of the area of interest are combined to a 3D model of the whole area of interest. The invention also relates to a system, a computer program and a computer program product.

13 Claims, 7 Drawing Sheets

(51) Int. Cl.
*G06T 15/04* (2011.01)
*G06T 19/20* (2011.01)
*G01C 11/06* (2006.01)

(52) U.S. Cl.
CPC ..... *G06T 19/20* (2013.01); *G06T 2207/10032* (2013.01); *G06T 2207/30181* (2013.01)

(56) References Cited

U.S. PATENT DOCUMENTS

| | | |
|---|---|---|
| 2003/0086604 A1 | 5/2003 | Oniyama |
| 2008/0050011 A1* | 2/2008 | Ofek ....................... G06T 17/05 382/154 |
| 2008/0205790 A1* | 8/2008 | Wear ..................... G06T 3/0068 382/284 |
| 2010/0250125 A1 | 9/2010 | Lundberg et al. |
| 2011/0282578 A1* | 11/2011 | Miksa ............... G06F 17/30241 701/532 |
| 2012/0179432 A1* | 7/2012 | Wivell .................. G06T 11/001 703/2 |
| 2012/0300979 A1* | 11/2012 | Pirchheim ............. G06T 7/2033 382/103 |
| 2013/0083959 A1* | 4/2013 | Owechko ........... G06K 9/00771 382/103 |
| 2014/0092217 A1* | 4/2014 | Tanner .................. G06T 7/0075 348/46 |

FOREIGN PATENT DOCUMENTS

| | | |
|---|---|---|
| WO | WO 2014/112908 A1 | 7/2014 |
| WO | WO 2014/112911 A1 | 7/2014 |

OTHER PUBLICATIONS

European Patent Office, Extended European Search Report for Application No. 14165716.3, Jun. 16, 2015, 9 pages, Germany.

* cited by examiner

METHOD AND A SYSTEM FOR BUILDING A THREE-DIMENSIONAL MODEL FROM SATELLITE IMAGES

BACKGROUND

Technical Field

The present invention relates to a system and a method for building a 3D model of an area of interest on the surface of a planet.

Description of Related Art

When building a three-dimensional (3D) model of a part of the Earth's surface one can use a camera system suitable for providing pictures from which stereo pairs can be generated. Then that camera system can be mounted on an airplane (sometimes together with a LIDAR-system for providing some height information, however, other height-measurement systems are possible as well). One can fly with the airplane over the area of interest, take pictures of the area of interest together with some height information and then process the pictures together with the height information to achieve a 3D model. This is well known in the state of the art.

Sometimes, however, it is not possible to use airplanes for providing pictures. This might be the case when there is no allowance for doing so, for example, due to flight-restricted areas. Another example is that the area of interest is too remote to be economically covered by airplanes or that the area of interest is too big to economically fly over it with airplanes. This might especially be the case when a 3D model of the whole Earth's surface or at least of the parts of the Earth surface which are covered by land should be provided.

3D models have been built via images taken by satellites as well. However, satellites are expensive to construct, to put into orbit and to control. Existing satellites aimed at providing images of the Earth's surface are mainly used for providing 2D images. Only few image data from satellites are nowadays provided as stereo photos and are thus used for building 3D models. One reason is that a satellite would have to take (at least) two photos of an area from different angles. It is often of higher priority that the satellite can take a picture of another area instead of the second photo from the same area, thus achieving a higher coverage of the Earth's surface.

BRIEF SUMMARY

One object of the present disclosure is to provide an improved way of building 3D models.

This has in one example been achieved by means of a method for building a 3D model of an area of interest on the surface of a planet. The method comprises providing a plurality of 2D images from satellites, where each 2D image out of the plurality of 2D images at least partly covers the area of interest. Also, each subarea of the area of interest is covered by at least two images, taken from different angles, out of the plurality of 2D images. Bundle adjustments are performed for the plurality of 2D images and the area of interest is divided into parts. For each part of the area of interest at least one combination and preferably all possible combinations out of two images covering that part of the area of interest are taken. Said two images are taken from the at least two images, taken from at least two different angles, out of the plurality of 2D images. Further, for each part of the area, point matching correspondence is established for a set of points for each such combination of two images. The sets of points are combined if more than one set of points exists. Even further, for each part of the area, a 3D model of said part of the area of interest is built based on the combined set of points. The 3D models from each part of the area of interest are combined to a 3D model of the whole area of interest.

An advantage of the method is that 3D models can be built over large areas, especially areas which are much bigger than an ordinary satellite image. There is no need that a stereo pair of the area of interest exists (which does not exclude to use stereo pairs as well in case they exist). This allows the use of images which have been taken during huge time spans, for example years. Thus more images can be used for building the 3D model. This leads to higher accuracy in the built 3D model.

In one example the images in the plurality of 2D images are taken from at least two different satellites.

This has the advantage that even more pictures can be used. Thus, the accuracy of the built 3D model can be increased and/or 3D models can be built for even bigger areas, since one satellite alone might not cover the whole AOI with enough images.

In one example an uncertainty for the points is calculated before the sets of points are combined if more than one set of points exists.

By doing so, a measure for the accuracy of the built 3D model can be achieved.

In one example combining the sets of points if more than one set of points exists comprises comparing the corresponding points from each set of points and removing points which have an uncertainty in their position which is higher than a predetermined value.

Points with high uncertainty are not as accurate as points with low uncertainty. Thus sorting them out can increase the accuracy of the built 3D model.

In one example combining the sets of points if more than one set of points exists comprises calculating the weighted mean values between the corresponding points. The points are weighted according to their uncertainty in position. The weighted mean values of the corresponding points are used for building the 3D model of the part of the area of interest.

An advantage of this method is that the low uncertainty points contribute more to the 3D model than high uncertainty point, thus increasing the quality of the 3D model.

In one example, combining the sets of points if more than one set of points exists comprises removing points which are further away from the centroid of the corresponding points than a predetermined value.

Since points which are far away from other corresponding points often are a result of errors in the calculation, removing these points increases the quality of the built 3D model.

In one example, combining the sets of points if more than one set of points exists comprises calculating the mean value between the corresponding points. The mean values of the corresponding points are used for building the 3D model of the part of the area of interest.

This gives a fast and easy calculation.

In one example the images in the plurality of 2D images are analysed according to one or more of the properties cloud coverage, angles from where an image is taken, which time of the year an image is taken, what date an image is taken, what daytime an image is taken, which resolution an image has, from which satellite an image is taken, in which colours an image is taken. Images, which do not fulfil predetermined requirements on the aforementioned properties, are dismissed from further processing.

This assures that only compatible images are used, thus reducing the probability that points are matched together which should not be matched together (for example, since they do not correspond to the same points in reality). This results in reduced errors and 3D models of better quality.

In one example the planet is the Earth.

Providing 3D models of the Earth opens up for a lot of applications.

In one example the parts of the area of interest overlap at least partially.

This results in a built 3D model of high quality since discontinuities are reduced.

In one example at least one additional image is provided after a 3D model was built. The at least one additional image is originally provided by at least one satellite which has less accuracy in determining its pointing direction than the satellites which originally provided the images used for building the 3D model. The at least one additional image is not included in the plurality of 2D images. The built 3D model is used to rectify the at least one additional image and the 3D model is rebuilt, where the plurality of 2D images now also includes the at least one additional image.

Images taken by satellites with low accuracy in pointing direction can have high resolution and quality in other parameters. By doing as described above these additional images can be used for building 3D models as well and one can overcome the disadvantages of less pointing accuracy which might have excluded these images from use in first sight. Using these additional images thus results in a better 3D model.

In one example, the process of providing at least one additional images after a 3D model was built, where the at least one additional image fulfils the above requirements, and the process of rectifying the at least one additional image and to rebuild the 3D model as described above are repeated for several sets of additional images.

By doing so one gets an even better 3D model.

The object is also achieved by providing a system for building a 3D model of an area of interest on the surface of a planet. The system comprises a memory or means having access to a plurality of 2D images from satellites, where each 2D image out of the plurality of 2D images at least partly covers the area of interest. Also, each subarea of the area of interest is covered by at least two images, taken from different angles, out of the plurality of 2D images. A processing element is arranged to performing bundle adjustment for the plurality of 2D images. It is also arranged to divide the area of interest into parts. It is arranged to take, for each part of the area of interest, at least one combination and preferably all possible combinations out of two images covering that part of the area of interest. Said two images are taken from the at least two images, taken from at least two different angles, out of the plurality of 2D images. Further, it is arranged to establish point matching correspondence for a set of points for each such combination of two images. It is further arranged to combine the sets of points if more than one set of points exists, and to build a 3D model of said part of the area of interest based on the combined set of points. The processing element is further arranged to combine the 3D models from each part of the area of interest to a 3D model of the whole area of interest.

An advantage of the system is that 3D models can be built over large areas, especially areas which are much bigger than an ordinary satellite image. There is no need that a stereo pair of the area of interest exists. This allows the use of images which have been taken during huge time spans, for example years. Thus more images can be used for building the 3D model. This leads to higher accuracy in the built 3D model.

In one example the processing element is further arranged to analyse the images in the plurality of 2D images according to one or more of the properties cloud coverage, angles from where an image is taken, which time of the year an image is taken, what date an image is taken, what daytime an image is taken, which resolution an image has, from which satellite an image is taken, in which colours an image is taken. It is also arranged to dismiss images from further processing which do not fulfil predetermined requirements on the aforementioned properties.

This assures that only compatible images are used, thus reducing the probability that points are matched together which should not be matched together (for example, since they do not correspond to the same points in reality). This results in reduced errors and 3D models of better quality.

In one example, the memory or means for having access to a plurality of 2D images from satellites are further arranged to provide at least one additional image after a 3D model was built. The at least one additional image is originally provided by at least one satellite which has less accuracy in determining its pointing direction than the satellites which originally provided the images used for building the 3D model. The at least one additional image is not included in the plurality of 2D images. The processing element is further arranged to use the built 3D model to rectify said at least one additional image, and to rebuild the 3D model, where the plurality of 2D images now also includes said at least one additional image.

Doing so results in a better 3D model.

The object is also achieved by a computer program comprising a program code for executing the method for building a 3D model of an area of interest on the surface of a planet.

The object is also achieved by a computer program product comprising a program code stored on a computer readable media for executing the method for building a 3D model of an area of interest on the surface of a planet.

DETAILED DESCRIPTION OF VARIOUS EMBODIMENTS

The following description will use the Earth's surface as an illustrative example for explaining the principles of the present invention. However, the invention is not constrained to the Earth's surface and can easily be used for the surface of other planets. The word planet should here and in the whole document also cover other objects in space which have a mass big enough so that satellites could orbit around them. One such example is a moon.

Here, and in the following the term image should be treated in a broad sense. In one example images refer to pictures. In one example images refer to raw data of an imaging device. In one example images refer to processed data of an imaging device. In one example said raw and/or processed data comes from an imaging device which has one or more sensors. In one example said one or more sensors are of charge-coupled device (CCD)-type. In one example said one or more sensors are complementary metal-oxide-semiconductor (CMOS)-sensors. In one example the imaging device is sensitive to visible light. In one example the imaging device is sensitive to other wavelengths than visible light, like infrared or ultraviolet light. It is known in the art how to convert different types of images into other types of images.

Figure 1:
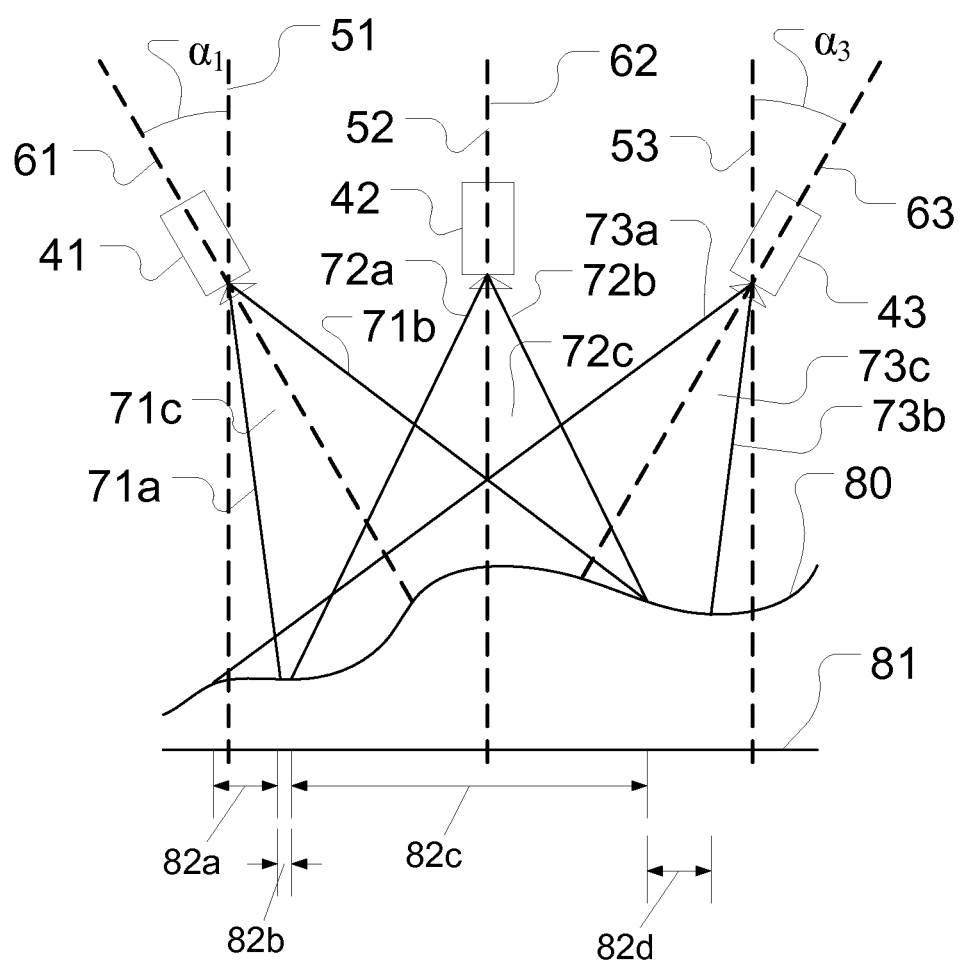
FIG. 1 shows a schematic sketch over how satellites can take images of an area.

FIG. 1 shows a two-dimensional schematic sketch over how satellites can take images of the Earth's surface 80. Three satellites 41, 42, 43 are sketched. FIG. 1 uses three satellites to explain the principle of the present invention. In general, however, any number of satellites could be used. In one example, the three satellites 41, 42, 43 are three different satellites. In another example, two out of the three satellites 41, 42, 43 are the same satellites. In one example 41 and 42 are the same satellites, in another example 41 and 43 are the same satellites and in yet another example 42 and 43 are the same satellites. In one example all three satellites 41, 42, 43 are the same. The three satellites 41, 42, 43 are equipped with imaging devices (not shown) which are capable of taking images of the surface of the Earth 80. In general, the surface of the Earth is different from a sea level 81. In one example the imaging devices are cameras. In one example the imaging devices contain one or more line scan sensors. In one example the imaging devices contain one or more area scan sensors. When referring to cameras here and in the future, the invention should not be considered to be constrained to cameras. The cameras of the satellites 41, 42, 43 have field of views 71c, 72c, 73c. The field of views are limited by the corresponding lines 71a, 71b for the camera of satellite 41, by lines 72a, 72b for satellite 42, and by lines 73a, 73b for satellite 43. Since the satellites 41, 42, 43 in general do not take images from the same position in the sky and in general do not have the same orientation, the images taken from the satellites 41, 42, 43 might overlap, and do in general not show exactly the same part of the Earth's surface. In the example of FIG. 1, the image taken by satellite 43 covers the section of the Earth's surface 80 which is indicated by 82a, 82b, 82c, and 82d when projected down to a flat surface 81. The image taken by satellite 42 consists of the section of the Earth's surface 80 which is indicated by 82c when projected down to a flat surface 81. The image taken by satellite 41 consists of the section of the Earth's surface 80 which is indicated by 82b and 82c when projected down to a flat surface 81. The satellites do not have to have the same orbit or the same altitude. In one example the satellites have different altitudes. The images of the satellites do not have to be taken at the same time. In one example the images of the satellites are taken at different times. In one example the images of one satellite have been taken several years after the images of another satellite.

The satellites have different angles $\alpha_1$, $\alpha_2$, and $\alpha_3$ when looking down to Earth, where the angles $\alpha_1$, $\alpha_2$, and $\alpha_3$ are defined as the angles between a line 51, 52, 53 from the satellite to the centre of the Earth and a centre line 61, 62, 63 for the field of views 71c, 72c, 73c of the cameras. In the present example the angle $\alpha_2$ is zero and thus not written in FIG. 1. The angles have both magnitude and sign, for example $\alpha_1$ has positive sign and $\alpha_3$ has negative sign. It is important that (at least two of) the angles $\alpha_1$, $\alpha_2$, and $\alpha_3$ differ from each other. If all angles $\alpha_1$, $\alpha_2$, and $\alpha_3$ were equal it would be impossible to establish a useful point matching correspondence between the images of the satellites, which will be needed at a later stage. This is known in the state of the art. The differences between the angles $\alpha_1$, $\alpha_2$, and $\alpha_3$ should not be too low to still see differences. In one example, a difference between the angles of at least 5° is preferred. This is to assure a good accuracy when determining the height. If, however, not enough satellite images are available with this minimum angle difference other angle differences can still be used.

In the example of FIG. 1 one can build a 3D model of the area 82b since two satellite images (from the satellites 41 and 43) are provided for that area. One can also build a 3D model from the area 82c since three satellite images are provided from that area (from the satellites 41, 42 and 43). For the areas 82a and 82d no 3D model can be built since only one satellite image is provided (from satellite 43).

Figure 2:
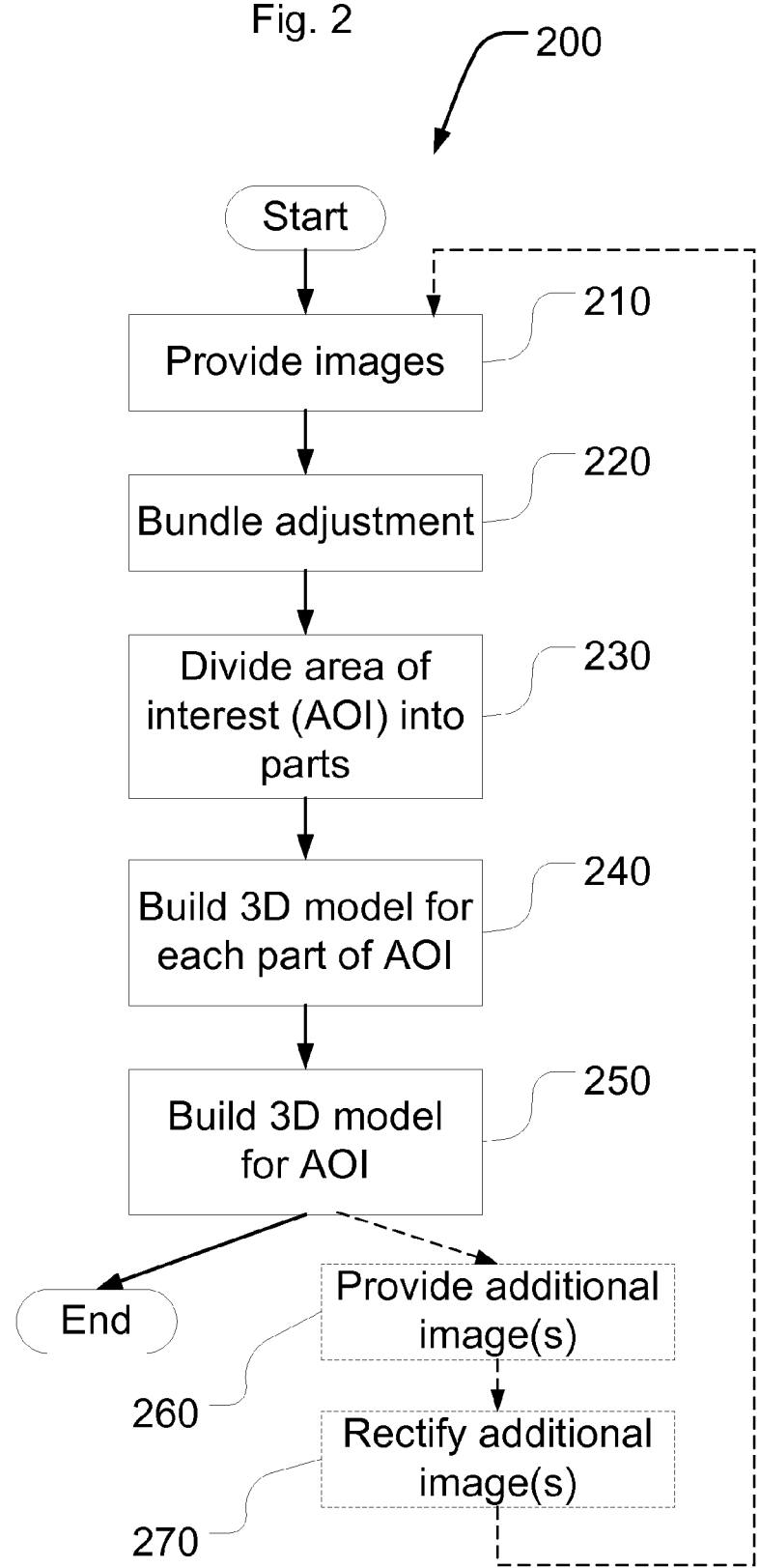
FIG. 2 shows a flowchart of a method for building a 3D model according to the present invention.

FIG. 2 shows a flowchart over a method 200 for building a 3D model of an area of interest (AOI) on the surface of a planet according to the present invention. In one example the AOI is a country or a part thereof. In one example the AOI is region or a part thereof. In one example the AOI is a city or a part thereof. In one example the AOI is the whole Earth. The method starts by step 210 of providing a plurality of 2D images of the AOI. The 2D images of the AOI are taken by satellites. When referring to images in the following it is always assumed that the images are 2D images out of the plurality of 2D images taken from the satellites, if not explicitly stated otherwise. Not all images have to cover the whole AOI. In one example at least one image only covers a part of the AOI. In one example this is due to that a part of at least one image is outside the AOI. In one example this is due to that the size of the area covered by at least one image is smaller than the size of the AOI. It is, however, important that each possible subarea of the AOI is covered by two or more images. It is also important that at least two out of these two or more images are taken from different angles. The angles have been discussed in more detail in relation with FIG. 1. In one example the term providing means getting access to images already taken at earlier moments in time, for example getting access to images stored in a database and/or in an archive. In one example the images in the plurality of 2D images are taken from at least two different satellites.

Preferably the amount of images is as big as possible since more images might result in higher accuracy of the final 3D model as will become obvious later. As is clear from FIG. 1 and FIG. 7 not all parts or possible subareas of the AOI might be covered by the same amount of images.

In one example, step 210 also includes analysing the images in the plurality of 2D images according to one or more of the properties cloud coverage, angles from where an image is taken, which time of the year an image is taken, what date an image is taken, what daytime an image is taken, which resolution an image has, from which satellite an image is taken, in which colours an image is taken, and dismissing images from further processing which do not fulfil predetermined requirements on the aforementioned properties. In one example Images which have more than marginal cloud coverage in the AOI are sorted out before further processing. In one example all images with a cloud coverage of more than a predetermined percentage of the whole image are sorted out. In one example only the parts of an image which have no cloud coverage are kept. In one example, when images taken from the same angle and showing the same or basically the same area are present, some or all of them but one are sorted out. In one example the most recent image is kept. In one example the image with highest resolution is kept. In one example the image with the highest accuracy is kept.

When building a 3D model of an area where the seasons have great impact on the appearance of the images of the area, the images can be sorted out or kept according to the seasons at which they were taken. One example is areas that are have deciduous trees and/or that are, in winter, usually covered by snow. In these areas both colour and height profile can change between the seasons. If an area gets lot of snow in winter, but roads are kept free from snow during winter, the height profile in this area changes during seasons. In that case it is advantageous to choose images from only one season, for example summer. Even sorting out images according to any other predetermined requirement might be helpful, if that requirement has an impact on the appearance of the AOI or on the possibility to build accurate 3D models later on in step 240 or step 250. It has, however, still to be assured that each part of the AOI is covered by two or more images and that at least two out of these two or more images are taken from different angles. If this is not assured, the method can in one example end after that step, resulting in the conclusion that a 3D model of the AOI cannot be built with the images at hand. In another example the predetermined requirements on the above mentioned properties can be made less restrictive to assure that a 3D model, although possibly with less accuracy, can be built.

The method continues with step 220.

In step 220 bundle adjustments are performed for the plurality of 2D images. How to perform bundle adjustments is well known in the art. In the bundling process consideration is in one example given to the fact that the images are taken from different satellites. In one example one such consideration is that internal and external parameters of the different satellites are modeled differently and/or can take different values. In one example different pointing accuracies of the satellites are taken into consideration when performing bundle adjustments. In one example sensor models of the satellites are taken into consideration when performing bundle adjustments. In one example the bundle adjustments are performed without ground control points. In one example external information is used when performing bundle adjustments. In one example ground control points and/or other vector data are used when performing bundle adjustments. The method continues with step 230.

In step 230 the AOI is divided into parts. In one example all parts have the same size. In another example at least some of the parts have different sizes. In a preferred example the parts are overlapping. This will become obvious later in relation with step 250. In a preferred example the size of the parts is much smaller than the average size of the area which is covered by an image. In a preferred example the size of a part of the AOI is so small that there is a low probability that one or more images only partly covers that part of the AOI. In other words, there is a high probability that every image either does not cover that part of the AOI at all or totally covers that part of the AOI. In a preferred example the size of a part of the AOI is so small that the number of images which only partly cover that part of the AOI is much lower than the number of images totally covering that part. The advantages of dividing the AOI in the aforementioned way will become obvious in relation with FIG. 3. The method continues with step 240.

In step 240 a 3D model is built for every part of the AOI. How this can be performed is described in more detail in relation with FIG. 3. In one example the 3D models for each part of the AOI are built consecutively. In another example the 3D models for each part of the AOI are built in parallel. The method continues with step 250.

In step 250 a 3D model of the whole AOI is built by combining the 3D models from each part of the AOI. Since 3D models have been built for all parts of the AOI in step 240, all the information is present which is needed to built a model of the whole AOI. Since all the 3D models of the parts of the AOI have been calculated separately it is not sure that the 3D models perfectly "fit" to each other. Especially if the parts of the AOI are non-overlapping there is a risk that the final 3D model of the whole AOI has some discontinuities ("jumps") at the edges where the 3D models from the parts of the AOI are "kitted" together. This is due to the fact that the values of the 3D models, which are close to the edge of a part of the AOI and which were calculated in step 240, have a higher uncertainty or less accuracy than values further apart from the edge. It is therefore advantageous to divide the AOI into overlapping parts in step 230. In this way even the 3D models of the parts of the AOI overlap. The values at the edge of the 3D models of the parts of the AOI can then be neglected and a smoother 3D model of the whole AOI is achieved. Alternatively or additionally one can take the mean value or the weighted mean value of the overlapping parts of the AOI to end up at a common 3D model for the whole AOI. Also other methods known in the state of the art for combining 3D models can be used. The method ends after step 250.

An advantage of the method is that all 2D images taken by satellites at any earlier time can be used for constructing a 3D model of an AOI. If only the requirements of step 210 are fulfilled no new satellite photos have to be taken. By combining the images taken from different satellites the amount of images available for building 3D models will become even more. This will on one hand result in that 3D models can be built for more areas. On the other hand it will result that the accuracy of the 3D models will become higher.

In one example method 200 does not stop after step 250. Instead, in step 260 at least one additional image will be provided after step 250, said at least one additional image being originally provided by at least one satellite which has less accuracy in determining its pointing direction than the satellites which originally provided the images used for building the 3D model, and said at least one additional image being not included in the plurality of 2D images. Satellites with less accurate pointing direction can provide images which are usually not so helpful at first hand for building 3D models in general, or for use in method 200 in special, since it is unclear, due to the uncertainty in the pointing direction of the satellites, which part of the Earth's surface is shown on these images. The images can nevertheless have high resolution and accuracy in other parameters, so that they might be helpful to improve a 3D model if only their position was known. Therefore, the built 3D model is in one example in the consecutive step 270 used to rectify said at least one additional image. In one example bundle adjustments are used for rectifying said at least one additional image. In one example a satellite model of the satellite(s) which took the at least one additional image is updated. Then the position of the image is known and the disadvantage of less accurate pointing direction of the satellite is overcome. Then the 3D model can be rebuilt according to the steps 210 to 250, where the plurality of 2D images now in the rebuilding process also includes the at least one additional image. Since the at least one additional image now can provide extra information and/or accuracy the rebuilt 3D model can use that extra information, thus building a better (i.e. more accurate) 3D model in the rebuilding process.

In one example the process of including additional images after the 3D model has been built, rectifying them, and rebuilding the 3D model is repeated several times with different additional images.

Figure 3:
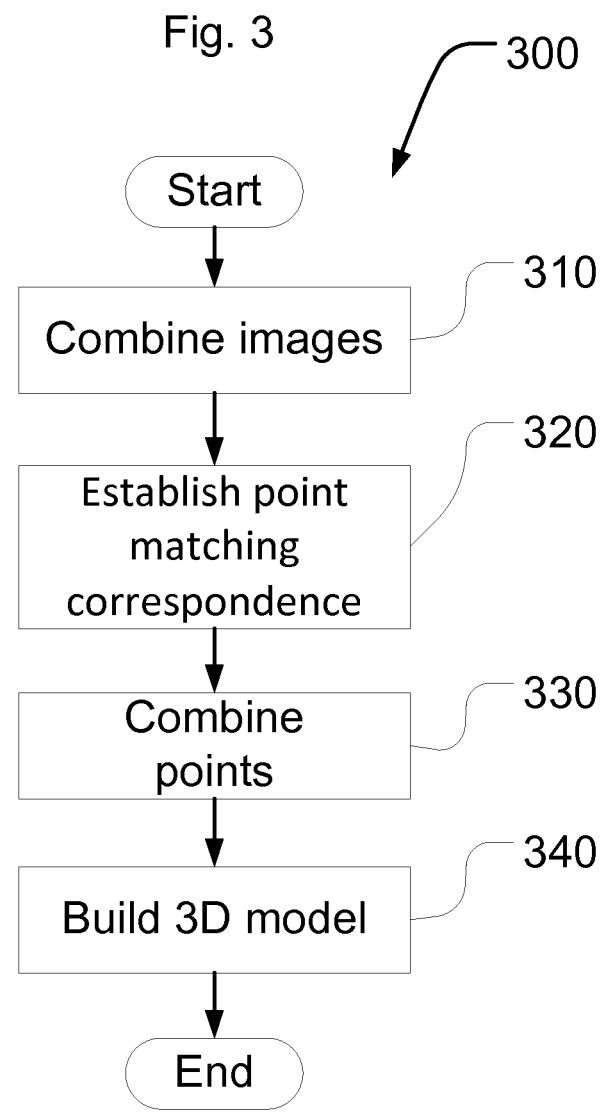
FIG. 3 shows a flowchart of a method for building a 3D model for a part of the area of interest (AOI).
Figure 5:
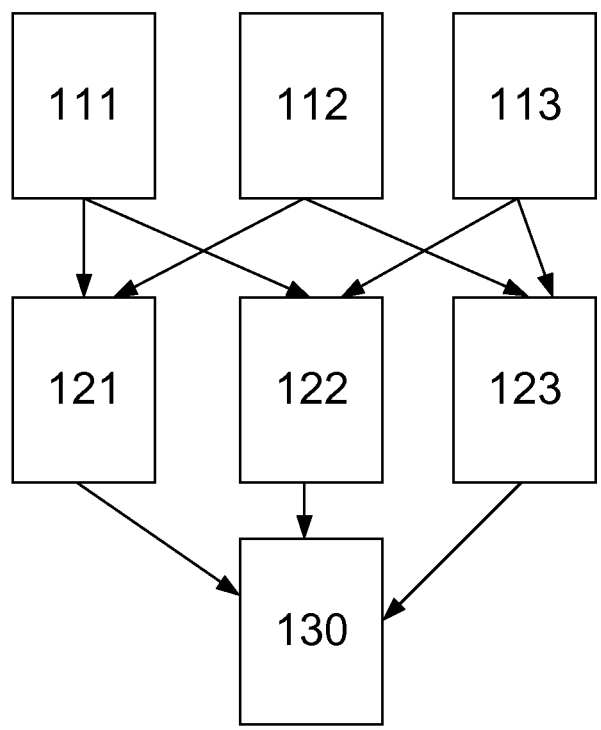
FIG. 5 shows a schematic sketch over how a part of the method is performed.

FIG. 3 shows the method 300 for building a 3D model of a part of the AOI. Performing the method 300 for each part of the AOI corresponds to performing step 240 of method 200. Method 300 starts with step 310. In step 310 at least one combination and preferably all possible combinations out of two images covering the part of the AOI are taken, where said two images are taken from the at least two images, taken from at least two different angles, out of the plurality of 2D images. In other words one starts by considering all the images of the plurality of 2D images which cover the part of the AOI. In a preferred example the term cover means totally cover. In another example, the term cover refers to partly cover. The following calculations are simplified when images are dismissed which do not totally cover the part of the AOI. However, it still has to be assured that there are at least two images left, taken from at least two different angles, which cover the whole part of the AOI. The more images are left the better, as will become clear soon. To achieve that consideration has to be given on how to divide the AOI into parts, as is described in connection with step 230. If not at least two images, taken from at least two angles, are left which totally cover the part of the AOI, then no, or at least not so many, images might be dismissed. For simplicity, it is assumed from here on that there are at least two images left, taken from at least two different angles, which totally cover the part of the AOI. From now on it is only important to consider the section of the images which is inside the part of the AOI. Now all possible combinations of two images are taken, where the two images are taken out of the at least two images, taken from at least two different angles, which are left. If only two images are left then only one combination can be taken. If three images from three different angles are taken then three different combinations can be taken (as shown in FIG. 5). In general, if n images are left then $(n^2-n)/2$ combinations can be taken (at maximum). If some of the images have the same angle or angles which are very close to each other then it is not useful to take combinations out of these images since no useful point matching correspondence can be established in the next step from these combinations. If, for example, two images out of three have the same angle then one can take the combinations between the third and each of the two images, but not a combination between the two images with the same angle. In this example thus only two combinations have been taken. The method continues with step 320.

In step 320 point matching correspondence is established for a set of points for each combination of two images which have been taken in step 310. Here, and in the whole document, when referring to points or set of points it is, unless explicitly otherwise stated, always assumed that the points have three-dimensional coordinates. Thus, when referring to point matching correspondence it is here and in the whole document assumed that this process will lead to points with three-dimensional coordinates. Each combination of two images from step 310 will thus result in a set of points. If, for example, two images were left in step 310, which resulted in one possible combination of the images in step 310, then one set of points is generated. If three combinations were taken in step 310 then three sets of points will be generated, and so on. The procedure of how to establish point matching correspondence out of a combination of two images is well known in the art. In one example establishing point matching correspondence includes feature point extraction. In one example doing bundle adjustments is used for establishing point matching correspondence. Point matching correspondence is in one example based on pixels of the images. In one example point matching is based on small local areas of the images. Here, and in the whole document, stereo matching should be treated as a special case of point matching. Thus, in one example point matching comprises stereo matching. In one example an uncertainty is calculated for each set of points. In one example the uncertainty is not the same for all points in a set of points (see FIG. 4). In one example the uncertainty is based on parameters of the satellites and/or parameters of the images from where the points originate. In one example the uncertainty is based on the cloud coverage of the images from where the points originate. In one example the uncertainty is based on the accuracy and/or uncertainty of parameters of the satellites and/or parameters of the images from where the points originate. In one example the number of points in each set of points is different. The method continues with step 330.

Figure 6:
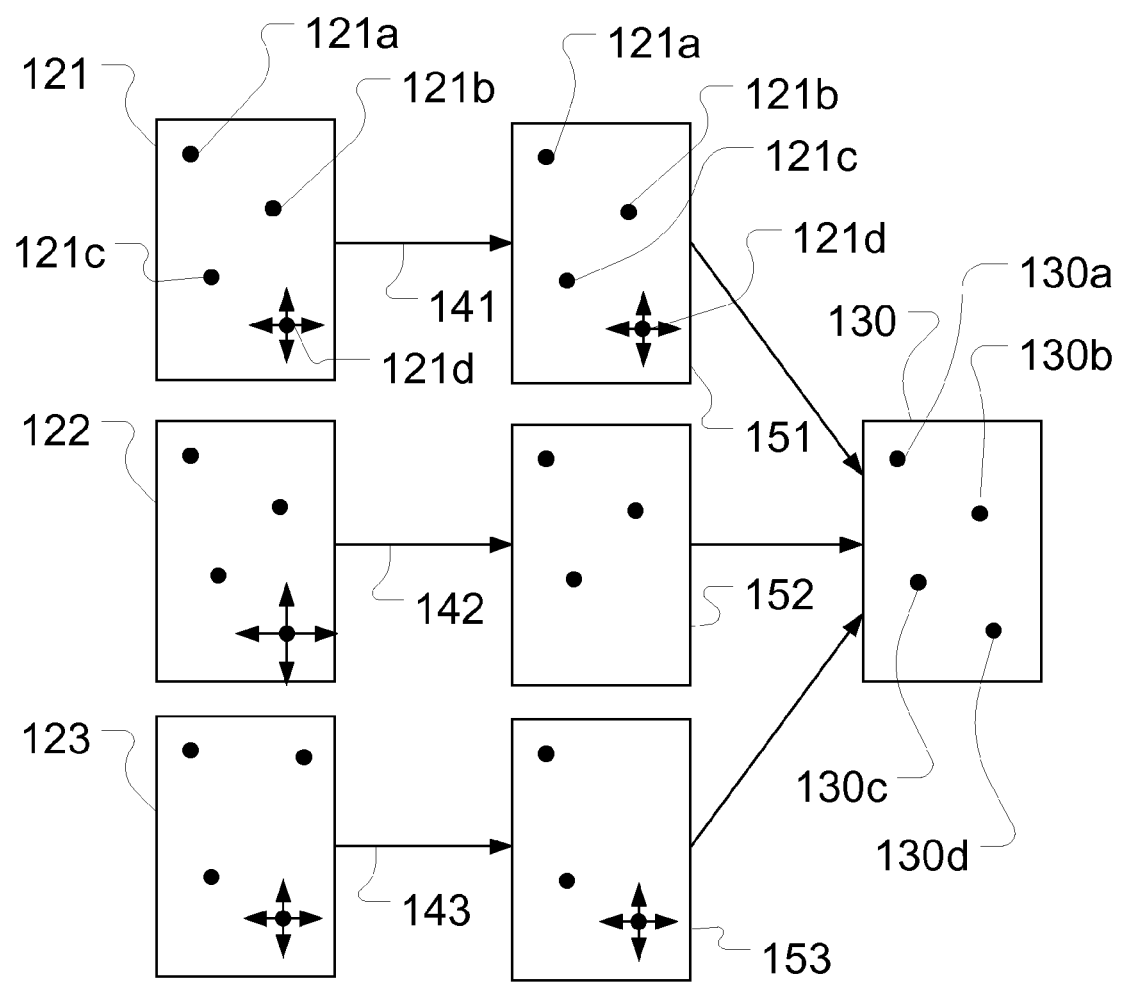
FIG. 6 shows in more detail a schematic sketch over how a part of the method is performed.

In step 330 the points for which point matching correspondence was established in step 320 are combined. In the trivial example of only one set of points there is no need for a combination and said one set will be the final set of points of step 330. If more than one set of points exists some rules have to be decided on how to make this combination. In a preferred example all points from the sets of points denoting the same three-dimensional point in space are compared to each other. This implies that at maximum one point from each set of points is compared. If, for example, three sets of points were created in step 320 then at maximum three points are compared. In one example points which have an uncertainty which is higher than a predetermined value are removed. In one example this predetermined value is an absolute value. In one example this predetermined value is a relative value which depends on the uncertainty of the other points. In one example points which are further away from the centroid of the corresponding points than a predetermined value are removed. In one example this predetermined value is an absolute value. In one example this predetermined value is a relative value which depends on the distance of the other points to the centroid. In one example combining the points includes calculating the mean value between the corresponding points and using the calculated mean values of the corresponding points for building the 3D model of the part of the AOI. An advantage hereof is that the calculation becomes simple and can be performed fast. In one example combining the points includes calculating the weighted mean value between the corresponding points and using the calculated weighted mean values of the corresponding points for building the 3D model of the part of the AOI. In one example the mean value is weighted with the uncertainty of the points. An advantage of that example is that points with low uncertainty contribute more to the combined set of points than points with high uncertainty. The step of combining the sets of points results in a final set of points which then will be used in the next step. An illustrative example of step 330 is depicted in FIG. 6. The method continues with step 340.

In step 340 a 3D model of the part of the AOI is built based on the combined points, i.e. based on the final set of points. It is known in the art how to built a 3D model out of a set of points. The method ends after step 340.

An advantage of the aforementioned method is that the number of sets of points which can contribute to the combined points in step 330 corresponds to the number of combinations of images in step 310. Thus, when the angles from where the images where taken are not too close to each other, having n images will result into $(n^2-n)/2$ sets of points. In other words, up to first order, the number of points is growing quadratically with the number of images. This gives a good increase in the accuracy of the resulting 3D model for the part of the AOI, and thus for the whole 3D model.

The 3D model could be any kind of 3D model known to those skilled in the art. In one example, the 3D model is represented as a mesh. In another example the 3D model is represented as a surface representation. In another example the 3D model is represented as a voxel representation. In one example the 3D model includes texture information. In one example the 3D model is a point cloud.

Figure 4:
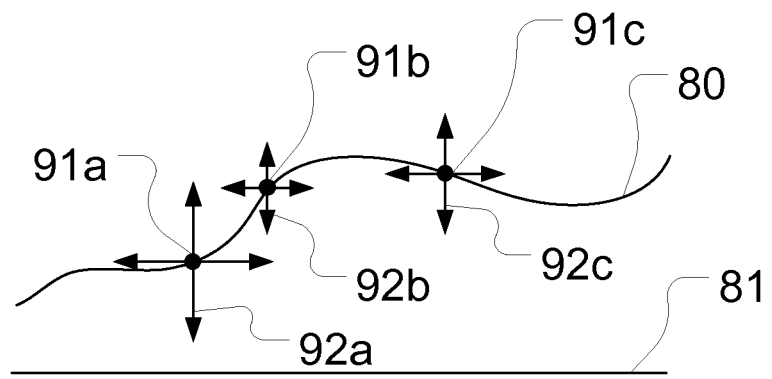
FIG. 4 shows a schematic sketch over points in an area.

FIG. 4 shows a two-dimensional cut of how points for which point correspondence has been established can look like in an area. In this example three points 91a, 91b, 91c are sketched. When performing the invention the number of points which are used is usually far beyond three. Here, however, for illustrative purposes, only three pairs are shown. In one example an uncertainty 92a, 92b, 92c is attributed to every point 91a, 91b, 91c. The uncertainty can be different for different points, as indicated in the figure. The uncertainty is also in the third dimension (not shown in the figure). In one example the uncertainty is different in different directions (not indicated in the figure).

FIG. 5 shows a schematic sketch of an example for providing a 3D model for a part of an area of interest, AOI. In this example three images 111, 112, 113 taken from three different angles are provided for the part of the AOI. Then, in step 310 of method 300, all possible combinations of two images out of these three images are taken, i.e. image 121 is a combination of image 111 and of image 112, image 122 is a combination of image 111 and of image 113, and image 123 is a combination of image 112 and of image 113. For those three combinations 121, 122, 123 points are then generated as described above. Finally the points are then combined into a single set of points 130.

FIG. 6 is a schematic example of how points can be combined. The combined images 121, 122, 123 correspond to the combined images of FIG. 5. For every combined image points will be generated as described earlier in relation with FIG. 3. Here, as an example, four points are generated in each combined image, for example the points 121a, 121b, 121c, 121d in the combined image 121. In practice, as mentioned earlier, the number of point will usually be much higher than that and is only limited here to four for illustrative purposes. Also in the combined images 122, 123 points are generated. Reference numbers have been omitted for not overloading FIG. 6. In one example, one calculates an uncertainty for the points, as is indicated for point 121d. The third dimension is not shown here for not overloading the figure. Possible uncertainties for the other points 121a, 121b, 121c have been omitted for not overloading FIG. 6. In one example, in the next step 141, 142, 143 points are removed for each combined image 121, 122, 123 according to some criteria as was described in more detail earlier. In the example of FIG. 6 one point has been removed in step 142 from the combined image 122 since the uncertainty of that point was higher than the uncertainty of the corresponding points in the other combined images 121, 123. In the example of FIG. 6 another point has been removed in step 143 from the combined image 123 since the distance between that point and the centroid defined by the point 121b and the corresponding points in the other combined images 122 and 123 is much bigger than the distance of the corresponding points in the combined images 121 and 123 to that centroid. Finally, the points are combined as described in step 330 of FIG. 3. In one example the mean values in the position between corresponding points are taken. These mean values are then considered to be the final set of points. In the example of FIG. 6 the final set of points 130a, 130b, 130c, 130d has been calculated by taking the mean value of point 121a and the two corresponding other points in 152 and 153 for achieving at point 130a, by taking the mean value of point 121b and the corresponding other point in 152 for achieving at point 130b, by taking the mean value of point 121c and the two corresponding other points in 152 and 153 for achieving at point 130c, and by taking the mean value of point 121d and the corresponding other point in 153 for achieving at point 130d.

Figure 7:
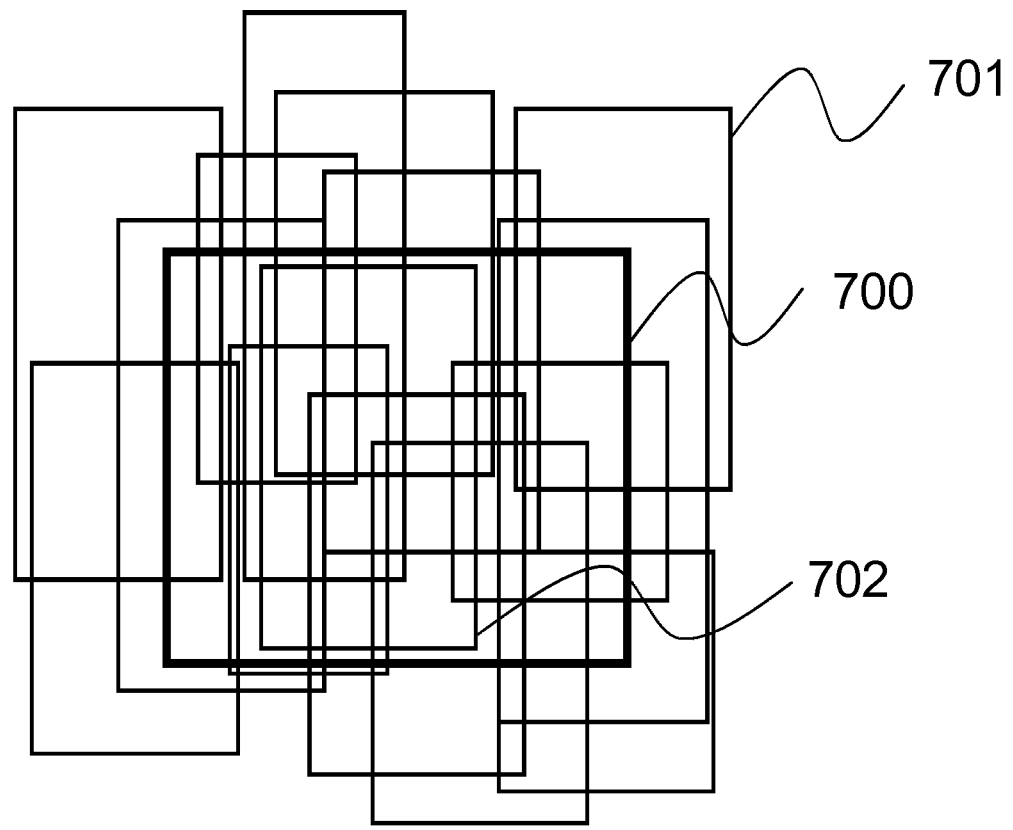
FIG. 7 is a sketch of an area of interest and how images from satellites can cover it.

FIG. 7 shows a sketch of an area of interest 700 and how images from satellites typically can cover it. In FIG. 7 the images from satellites are drawn with thinner lines than the AOI. Some parts of the AOI are covered by more images than other parts. Some images, like image 701, are partly outside and partly inside the AOI. Other images, like 702 are completely inside the AOI. In one example an image covers the whole AOI (not shown in the FIG. 7). In the example of FIG. 7 some of the images have different sizes. In one example (not shown) the images have different orientations and/or different shapes. In one example at least some of the images are taken from different satellites. In one example much more images than indicated in FIG. 7 are, at least partly, covering the AOI.

Figure 8:
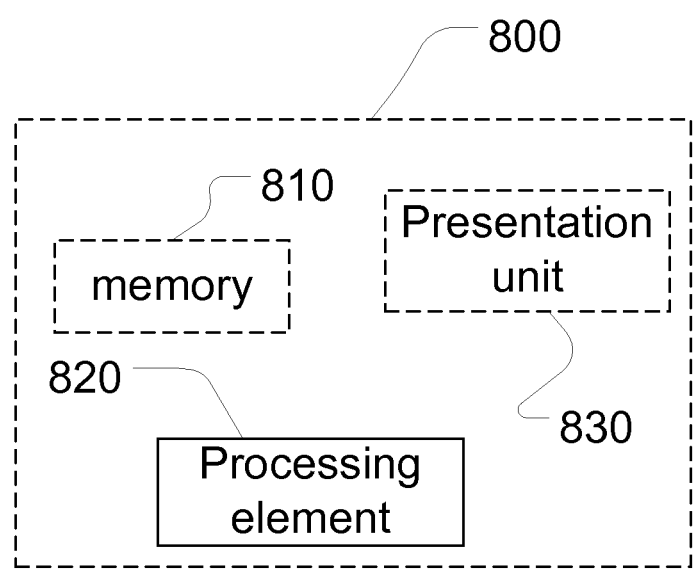
FIG. 8 shows an example of a system for building a 3D model of an area of interest on the surface of a planet

FIG. 8 shows a system 800 for building a 3D model of an area of interest on the surface of a planet. The system comprises a memory 810 or means for having access to a plurality of 2D images from satellites, where each 2D image out of the plurality of 2D images at least partly covers the area of interest, and where each subarea of the area of interest is covered by at least two images, taken from different angles, out of the plurality of 2D images. In one example the memory 810 comprises the plurality of 2D images. In one example the system comprises means for having access to the plurality of 2D images. In one example the plurality of 2D images is stored in a database. In one example the plurality of 2D images is stored at one or more remote locations and the means for having access to the plurality of 2D images are arranged to supply the plurality of 2D images via a network to the arrangement. In one example the plurality of 2D images is supplied via wireless communication. In one example the plurality of 2D images is supplied via wired communication. The access to the plurality of 2D images is in one example provided by means of an interface (not shown in the figure).

The system 800 further comprises a processing element 820. The processing element 820 is arranged to perform bundle adjustment for the plurality of 2D images. The processing element is further arranged to divide the area of interest into parts, and for each part of the area of interest to take at least one combination and preferably all possible combinations out of two images covering that part of the area of interest, where said two images are taken from the at least two images, taken from at least two different angles, out of the plurality of 2D images, to establish point matching correspondence for a set of points for each such combination of two images, to combine the sets of points if more than one set of points exists, and to build a 3D model of said part of the area of interest based on the combined set of points. The processing element 820 is even further arranged to combine the 3D models from each part of the area of interest to a 3D model of the whole area of interest.

In one example, the processing element 820 is further arranged to analyse the images in the plurality of 2D images according to one or more of the properties cloud coverage, angles from where an image is taken, which time of the year an image is taken, what date an image is taken, what daytime an image is taken, which resolution an image has, from which satellite an image is taken, in which colours an image is taken, and to dismiss images from further processing which do not fulfil predetermined requirements on the aforementioned properties.

In one example the memory 810 or means for having access to a plurality of 2D images from satellites are further arranged to provide at least one additional image after a 3D model was built, said at least one additional image being originally provided by at least one satellite which has less accuracy in determining its pointing direction than the satellites which originally provided the images used for building the 3D model, and said at least one additional image being not included in the plurality of 2D images. In this example the processing element 820 is further arranged to use the built 3D model to rectify said at least one additional image, and to rebuild the 3D model. The rebuilding of the 3D model is performed in the same way as the previous 3D model was built (see FIG. 2), where the plurality of 2D images now also includes said at least one additional image.

In one example the processing element 820 comprises one or more processing units. In one example the processing element comprises several processing units. In one example the processing units are located at remote locations and arranged to communicate with each other.

The system 800 comprises in one example a computer program comprising a program code for executing the method for building a 3D model of an area of interest on the surface of a planet.

In one example the system 800 also comprises a presentation unit 830. The presentation unit is arranged to present the built 3D model. In one example the presentation unit 830 is a display. In one example the presentation unit 830 is a screen. In one example the presentation unit 830 is a printer. In one example the presentation unit 830 is a projector. In one example the presentation unit 830 is arranged to receive information from the processing element 820.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for building a 3D model of an area of interest on the surface of a planet, the method comprising:
   providing a plurality of 2D images taken from at least two different satellites, where each 2D image out of the plurality of 2D images at least partly covers the area of interest, and where each subarea of the area of interest is covered by at least three images, taken from different angles, out of the plurality of 2D images;
   performing bundle adjustments for the plurality of 2D images;
   dividing the area of interest into parts, wherein said step of dividing comprises for each part of the area of interest:
      taking all possible combinations out of two images covering that part of the area of interest, wherein said two images are taken from the at least three images, taken from different angles, out of the plurality of 2D images;
      establishing point matching correspondence for a set of points for each of the all possible combinations of two images;
      combining the sets of points; and
      building a 3D model of said part of the area of interest based on the combined set of points; and
   combining the 3D models from each part of the area of interest to a 3D model of the whole area of interest.

2. A method according to claim 1, wherein an uncertainty for the points is calculated before combining the sets of points.

3. A method according to claim 2, wherein the step of combining the sets of points comprises comparing the corresponding points from each set of points and removing points which have an uncertainty in their position which is higher than a predetermined value.

4. A method according to claim 2, wherein the step of combining the sets of points comprises:
   calculating the weighted mean values in position between the corresponding points, where the points are weighted according to their uncertainty in position, and
   using the weighted mean values in the position of the corresponding points for building the 3D model of the part of the area of interest.

5. A method according to claim 1, wherein the step of combining the sets of points comprises calculating the mean value in position between the corresponding points and using the mean values in the position of the corresponding points for building the 3D model of the part of the area of interest.

6. A method according to claim 1, further comprising the steps of analysing the images in the plurality of 2D images according to one or more of the properties cloud coverage, angles from where an image is taken, which time of the year an image is taken, what date an image is taken, what daytime an image is taken, which resolution an image has, from which satellite an image is taken, in which colours an image is taken; and dismissing images from further processing which do not fulfil predetermined requirements on the aforementioned properties.

7. A method according to claim 1, wherein the parts of the area of interest overlap at least partially.

8. A method according to claim 1, further including the steps of:
   providing at least one additional image after building of the 3D model, said at least one additional image being originally provided by at least one satellite which has less accuracy in determining its pointing direction than the satellites which originally provided the images used for building the 3D model, and said at least one additional image being not included in the plurality of 2D images;
   using the built 3D model to rectify said at least one additional image; and generating a rebuilt 3D model, where the plurality of 2D images now also includes said at least one additional image.

9. A method according to claim 8, wherein the additional steps are repeated for several sets of additional images.

10. A non-transitory computer program product comprising a program code stored on a computer readable media for executing the method for building a 3D model of an area of interest on the surface of a planet according to claim 1.

11. A system for building a 3D model of an area of interest on the surface of a planet, the system comprising:
   at least one of a memory or means for having access to a plurality of 2D images taken from at least two different satellites, wherein each 2D image out of the plurality of 2D images at least partly covers the area of interest, and wherein each subarea of the area of interest is covered by at least three images, taken from different angles, out of the plurality of 2D images; and
a processing element configured for:
   performing bundle adjustment for the plurality of 2D images, to divide the area of interest into parts, and
   for each part of the area of interest, to:
      take all possible combinations out of two images covering that part of the area of interest, where said two images are taken from the at least three images, taken from different angles, out of the plurality of 2D images,
      establish point matching correspondence for a set of points for each of the all possible combinations of two images,
      combine the sets of points, and
      build a 3D model of said part of the area of interest based on the combined set of points; and
   combining the 3D models from each part of the area of interest to a 3D model of the whole area of interest.

12. The system of claim 11, wherein the processing element is further configured to analyse the images in the plurality of 2D images according to one or more of the properties cloud coverage, angles from where an image is taken, which time of the year an image is taken, what date an image is taken, what daytime an image is taken, which resolution an image has, from which satellite an image is taken, in which colours an image is taken, and to dismiss images from further processing which do not fulfil predetermined requirements on the aforementioned properties.

13. The system of claim 11, wherein the memory or means for having access to a plurality of 2D images from satellites further are configured to provide at least one additional image after a 3D model was built, said at least one additional image being originally provided by at least one satellite which has less accuracy in determining its pointing direction than the satellites which originally provided the images used for building the 3D model, and said at least one additional image being not included in the plurality of 2D images; and wherein the processing element is further arranged to use the built 3D model to rectify said at least one additional image, and to rebuild the 3D model, where the plurality of 2D images now also includes said at least one additional image.

* * * * *